(12) United States Patent
Weslati et al.

(10) Patent No.: US 8,401,733 B2
(45) Date of Patent: Mar. 19, 2013

(54) OPTIMIZED POWERTRAIN WITH ROUTE-LEARNING FEATURE

(75) Inventors: Feisel Weslati, Troy, MI (US); Gurunath Kedar-Dongarkar, Rochester, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 441 days.

(21) Appl. No.: 12/641,919

(22) Filed: Dec. 18, 2009

(65) Prior Publication Data

US 2011/0153127 A1 Jun. 23, 2011

(51) Int. Cl.
*G01C 21/26* (2006.01)
(52) U.S. Cl. .............. 701/36; 701/70; 701/93; 701/468
(58) Field of Classification Search .................... 701/22, 701/36, 79, 77, 93, 96, 101, 102, 106, 117, 701/468, 70
See application file for complete search history.

(56) References Cited

U.S. PATENT DOCUMENTS

| 4,982,620 | A | 1/1991 | Holbrook et al. | |
|---|---|---|---|---|
| 6,449,572 | B1 | 9/2002 | Kurz et al. | |
| 7,149,653 | B2 | 12/2006 | Bihler et al. | |
| 7,539,562 | B2 * | 5/2009 | Maguire et al. | 701/22 |
| 2007/0208467 | A1 * | 9/2007 | Maguire et al. | 701/22 |

* cited by examiner

*Primary Examiner* — Richard M. Camby
(74) *Attorney, Agent, or Firm* — Ralph E. Smith

(57) ABSTRACT

The technology described herein provides a powertrain system with a route-learning feature. Particularly, learned information is used to optimize powertrain operation along any learned route. The learned information comprises, generally, feedback from the vehicle's acceleration and brake sensors and information from an on-board trip computer. At the least, the powertrain is able to optimize its operation to a driver's preference based on the feedback recorded along a particular route that the driver has specified. The route-learning powertrain control described herein is particularly useful with a hybrid powertrain, and can be used to optimize start/stop and regenerative braking control. The system described herein can also be integrated with a navigation system and GPS receiver, to provide more accurate route-learning and/or automated operation.

20 Claims, 4 Drawing Sheets

OPTIMIZED POWERTRAIN WITH ROUTE-LEARNING FEATURE

FIELD OF THE INVENTION

The technology herein relates generally to vehicle powertrain customization or optimization, and specifically to a hybrid powertrain with a route-learning feature. Possible applications of this technology are in a hybrid powertrain where there are opportunities to customize start/stop and regenerative braking operations, battery conditioning, engine cylinder deactivation, transmission shifting, Interactive Decel Fuel Shut-Off (iDFSO) and operation of other vehicle systems when the driver's route is known in advance, or specified by the driver.

BACKGROUND OF THE INVENTION

Hybrid vehicles, i.e., those that utilize both internal combustion and electric motors, provide drivers with dramatically increased fuel economy. Technologies such as engine start/stop, regenerative braking, battery conditioning, engine cylinder deactivation, transmission operation range and Interactive Decel Fuel Shut-Off (iDFSO) are used to limit fuel consumption and eliminate the need for on-board batteries to be recharged externally. Although drivers benefit greatly from the increased fuel economy, the driving experience can be affected by the operation of the hybrid powertrain. Particularly, hybrid powertrains tend to be programmed to operate in the most fuel conscious manner, which can leave the driver wanting more power from the vehicle, or feeling that the vehicle is not as responsive as they might prefer, especially on commonly-driven routes.

Generally, existing powertrains are unable to adapt to how a driver prefers a vehicle to operate along a particular route. Although known powertrain components such as those described in U.S. Pat. No. 4,982,620 can have limited integrated learning capacity, that learning capacity is confined to shift timing. Moreover, the learning capacity is not driver-controlled in any way, and it is driver and route agnostic. Yet, as noted above, the driver's perception of vehicle control can vary with hybrid powertrains because of the nature of how they operate. Accordingly, there is a need for a hybrid powertrain (and a powertrain generally) with an ability to learn how a driver prefers a vehicle operate on a given route and to subsequently optimize powertrain operation on that route according to the learned driving preferences.

BRIEF SUMMARY OF THE INVENTION

In various example embodiments, the technology described herein provides a powertrain system with a route-learning control feature. In particular, the feature gives the driver an enabler to customize the driving experience, fuel economy savings, emission reduction and overall powertrain performance. Particularly, learned information is used to optimize powertrain operation along a learned route. The learned information comprises, generally, feedback from the vehicle's acceleration and brake sensors, steering wheel angle, driver torque demands, data from vehicle lateral and longitudinal acceleration sensors and information from an on-board navigation element such as, e.g., an odometer. At the least, the powertrain is able to optimize its operation to a driver's preference based on the feedback recorded along a particular route that the driver has specified. In doing so, the driver feels empowered when operating the vehicle, because the vehicle is specifically responding to the driver's preferred operating characteristics and style. As an example, if the driver prefers a more fuel efficient driving operation (which can be determined from relative acceleration pedal sensor measurements and the way the driver brakes, makes turns, changes lanes, etc.), shift timing can be altered to prefer a low-RPM shift schedule on the route. If the driver prefers a more aggressive driving operation along the route, a high-RPM shift schedule can be enabled for the route.

In one embodiment, the route-learning powertrain control feature is integrated into a hybrid electric/internal combustion powertrain, and is used to control vehicle response (e.g., transmission shifting, battery conditioning, Interactive Decel Fuel Shut-Off), start/stop functionality and regenerative braking control. When a vehicle is equipped with regenerative braking control, the route-learning powertrain control feature can recognize if a given route is through a sustained period of stop-and-go traffic and enable single-pedal control. In other words, activation of the automatic regenerative braking can be enabled for the part of the known route where the vehicle is most likely to be in constant start/stop motion. It is understood that the route-learning powertrain control mechanism could be used to optimize any powertrain element. By way of the example given above regarding shift schedules, the route-learning powertrain control could also modify start/stop timing to emphasize internal combustion operation if the driver prefers a more aggressive operating style, or more electric motor operation if the driver prefers a more fuel efficient operating style.

In another embodiment, the driver is provided with a display/user interface for operating the route-learning powertrain control feature. The driver can define an unlimited number of routes and activate those routes when desired. The defined routes and the collected data are stored in a memory connected to the route-learning powertrain control mechanism. When a route is active, the powertrain will optimize operation based on previously recorded feedback along that particular route. In still another embodiment, when a route is active, the route-learning powertrain control will record driver feedback as the vehicle is being operated over the route, and use that feedback to further refine its operation.

In yet another embodiment, the route-learning powertrain control mechanism is connected to additional navigation devices, such as an on-board GPS receiver, compass or an altimeter. Data from these navigation elements can be used to further optimize alteration of the powertrain, or provide the route-learning powertrain control feature with an error-checking element. For instance, if the navigation element data does not match a given route (e.g., the route indicates the driver should be driving north, but compass data shows the vehicle headed east), the driver can be prompted to make sure that they have correctly selected the desired route.

In a further embodiment, the route-learning powertrain control mechanism is interfaced with an on-board navigation system including a GPS receiver. Instead of the driver having to define particular routes, the route-learning powertrain control feature can operate automatically based on control of the navigation system. For instance, the navigation system can indicate that the driver is currently at home and has chosen as a destination the driver's office. In one embodiment, the driver can be prompted to activate the route-learning powertrain control feature. In another embodiment, the route-learning powertrain control feature can be automatically activated when a destination is entered into the navigation system. The navigation system can also provide data to the powertrain to inform the powertrain of upcoming drive events such as stops and turns, which can be used in optimization of powertrain operation. In the event that the driver has forgotten to enable the route-learning feature, the navigation system can determine that the vehicle is operating on a programmed route and prompt the driver to activate the route-learning powertrain control feature.

There has thus been outlined, rather broadly, the features of the technology in order that the detailed description that follows may be better understood, and in order that the present contribution to the art may be better appreciated. There are additional features of the technology that will be described and which will form the subject matter of the claims. Additional aspects and advantages of the technology will be apparent from the following detailed description of an example embodiment which is illustrated in the accompanying drawings. The technology is capable of other embodiments and of being practiced and earned out in various ways. Also, it is to be understood that the phraseology and terminology employed are for the purpose of description and should not be regarded as limiting.

BRIEF DESCRIPTION OF THE DRAWINGS

The technology is illustrated and described herein with reference to the various drawings, in which like reference numbers denote like method steps and/or system components, and in which.

DETAILED DESCRIPTION OF THE INVENTION

Before describing the disclosed embodiments of the technology in detail, it is to be understood that the technology is not limited in its application to the details of the particular arrangement shown here since the technology is capable of other embodiments. Also, the terminology used herein is for the purpose of description and not of limitation.

Figure 1:
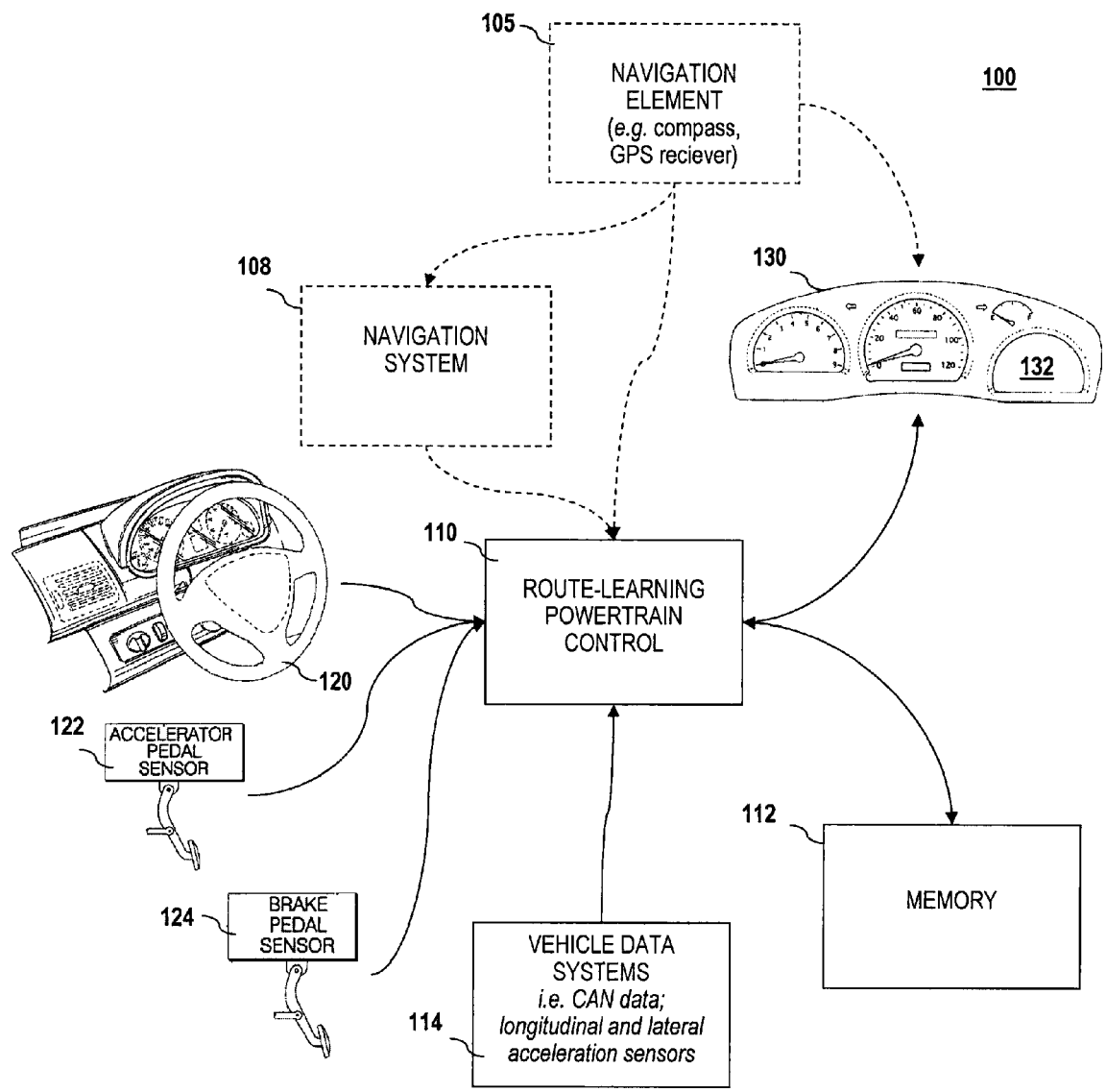
FIG. 1 shows an example route-learning powertrain control system, according to an embodiment described herein.

FIG. 1 shows an example powertrain system 100 with a route-learning control feature. In the system 100, a route-learning powertrain control unit 110 is connected to a plurality of driver inputs including steering column 120, an accelerator pedal sensor 122 and a brake pedal sensor 124. The route-learning powertrain control unit 110 has an onboard memory 112. One or more navigation elements 105 such as, e.g., a compass, an odometer, an altimeter, or a GPS receiver are optionally connected to the route-learning powertrain control unit 110 as inputs. A navigation system 108 is also optionally connected to the route-learning powertrain control unit 110. Additionally, one or more vehicle data systems 114 (supplying CAN data, chassis data, longitudinal or lateral acceleration data, or the like) can be optionally connected to the route-learning powertrain control unit 110.

Figure 2:
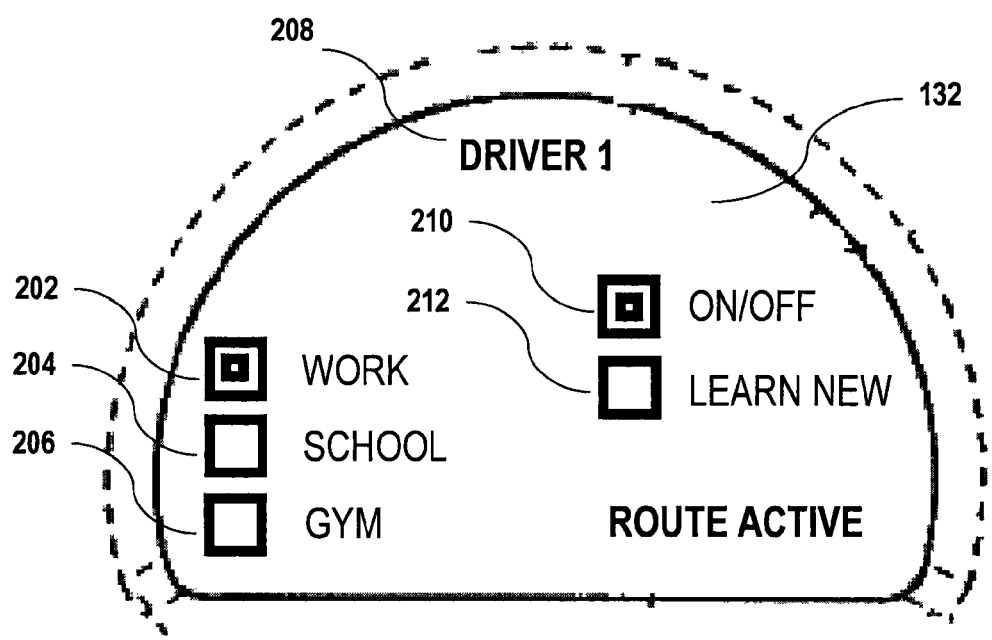
FIG. 2 shows a display for use with a route-learning powertrain control system, according to an embodiment described herein.

The vehicle dashboard 130 is also connected to the route-learning powertrain control unit 110 and is operable to receive an output from route-learning powertrain control unit 110 and display associated information on a display 132. As is seen in FIG. 2, the display 132 can indicate whether the route-learning powertrain control feature is active or not. As also shown in FIG. 2, the route-learning powertrain control unit 110 can be controlled through a selection of one or more defined routes, e.g., work 202, school 204, and gym 206. An indication of selected driver 208 is provided. General activation and deactivation of the route-learning powertrain control feature is provided at selection 210. The driver can also define a new route for the route-learning powertrain control unit 110 using selection 212. Though not pictured, display 132 can be equipped with a touch screen to register driver selections. It is understood that any manner of user input could be integrated, including a trackball or other interface device on the console. It should also be appreciated that voice recognition could also be used to input the driver's selections. When a new route is defined using selection 212, the route-learning powertrain control unit 110 begins recording data from the connected driver inputs until the driver indicates that the end of route has been reached, or the vehicle is turned off. This recording operation is referred to herein as a "learning mode."

When in operation, the route-learning powertrain control unit 110 conforms powertrain operation to at least one driver preference that is determined from an analysis (optionally in real-time) of data collected in the learning mode. Particularly, the driving preference could be a determination as to which of one or more modes of operation (e.g., economy, sport, long-distance) the observed driver input aligns best with. As well, the observed driver input could be aligned along a programming scale measuring efficiency against desired performance. In another embodiment, the route-learning powertrain control unit 110 can use the data collected to determine if a different operation mode is appropriate for different segments of the route. For instance, one segment of the route could be highway-driving, for which it can be determined that the driver prefers a more aggressive or sporty operation, and another segment could be city-driving where there is traffic and it can be determined that the driver prefers a more economic operation, e.g., operation conducive to stop-and-go traffic where acceleration is not emphasized. The driver preference could be associated with one or more programmed driving styles (e.g., aggressiveness levels) which the route-learning powertrain control unit 110 can apply to powertrain operation.

Although not shown, the display 132 can also prompt the driver to activate or deactivate the route-learning powertrain control unit feature. In one embodiment, where one or more navigation elements 105 are connected to the route-learning powertrain control unit 110, the route-learning powertrain control unit 110 can prompt the driver if it determines, based on a comparison between prior-recorded data about a selected route and incoming data from the one or more navigation elements 105, that driver may have incorrectly selected a given route.

Although display 132 is shown, it is understood that through integration with an on-board navigation system 108 having its own display (not shown), a separate display 132 for the route-learning powertrain control unit feature may not be needed.

When the route-learning powertrain control unit 110 is interfaced with an on-board navigation system 108, the route-learning powertrain control unit 110 can operate automatically based on control of the navigation system 108. For instance, the navigation system 108 may indicate that the driver is currently at home, and may register an input from the driver for a destination of the driver's office. In one embodiment, the driver can be prompted to activate the route-learning powertrain control unit feature. In another, the route-learning powertrain control unit 110 can be automatically activated when a destination is entered into the navigation system 108 that a predetermined route has been defined for. In yet another embodiment, data regarding routes entered into the navigation system 108 can be automatically collected and the route-learning powertrain control unit 110 activated whenever a previously driven route has been specified.

Although the above route-learning powertrain control unit 110 can be used in any powertrain system, it is especially useful in hybrid powertrain vehicles, e.g, vehicles which have both internal combustion and electric motors and have sophisticated programming to switch between the two. Hybrid powertrains generally integrate both start/stop functionality, which is used to deactivate the internal combustion engine when it is not needed and control consumption/conservation of battery power, and regenerative braking control, which recharges on-board batteries by rerouting braking force back into the electric motor to convert it to storable energy. In doing so, the vehicle is automatically slowed without application of force by the braking system. In stop-and-go traffic, such a system can be especially useful because it enables one-pedal driving, that is, when the driver lightens the force on the pedal connected to the acceleration sensor 122, regenerative braking automatically and proportionally engages to slow the vehicle down. Other vehicle systems which are generally integrated into hybrid powertrains and which can be managed by the route-learning powertrain control unit 110 include battery conditioning systems, engine cylinder deactivation or variable cylinder displacement systems, and an Interactive Decel Fuel Shut-Off (iDFSO) system, which is operable to reduce fuel supply to the engine while decelerating to increase fuel economy.

Although these two control systems provide enhanced fuel economy, most of the available power in the vehicle still comes from the internal combustion engine. Thus, for routes where the driver prefers a more aggressive style of operation, start/stop functionality can be modified to keep the internal combustion engine active at all times. For routes where the driver prefers a more economic style of operation, e.g., in a city-driving environment, emphasis on the electric motor can be increased and regenerative braking control more consistently activated to recycle expended energy. In one embodiment, automatic regenerative braking can be enabled to provide single-pedal driving functionality for the part of a route where the vehicle is most likely to be in traffic, and therefore in constant acceleration and deceleration.

It is noted, however, that the above-mentioned powertrain controls are merely examples, and the route-learning powertrain control feature disclosed herein could be used to optimize any powertrain element.

Figure 3:
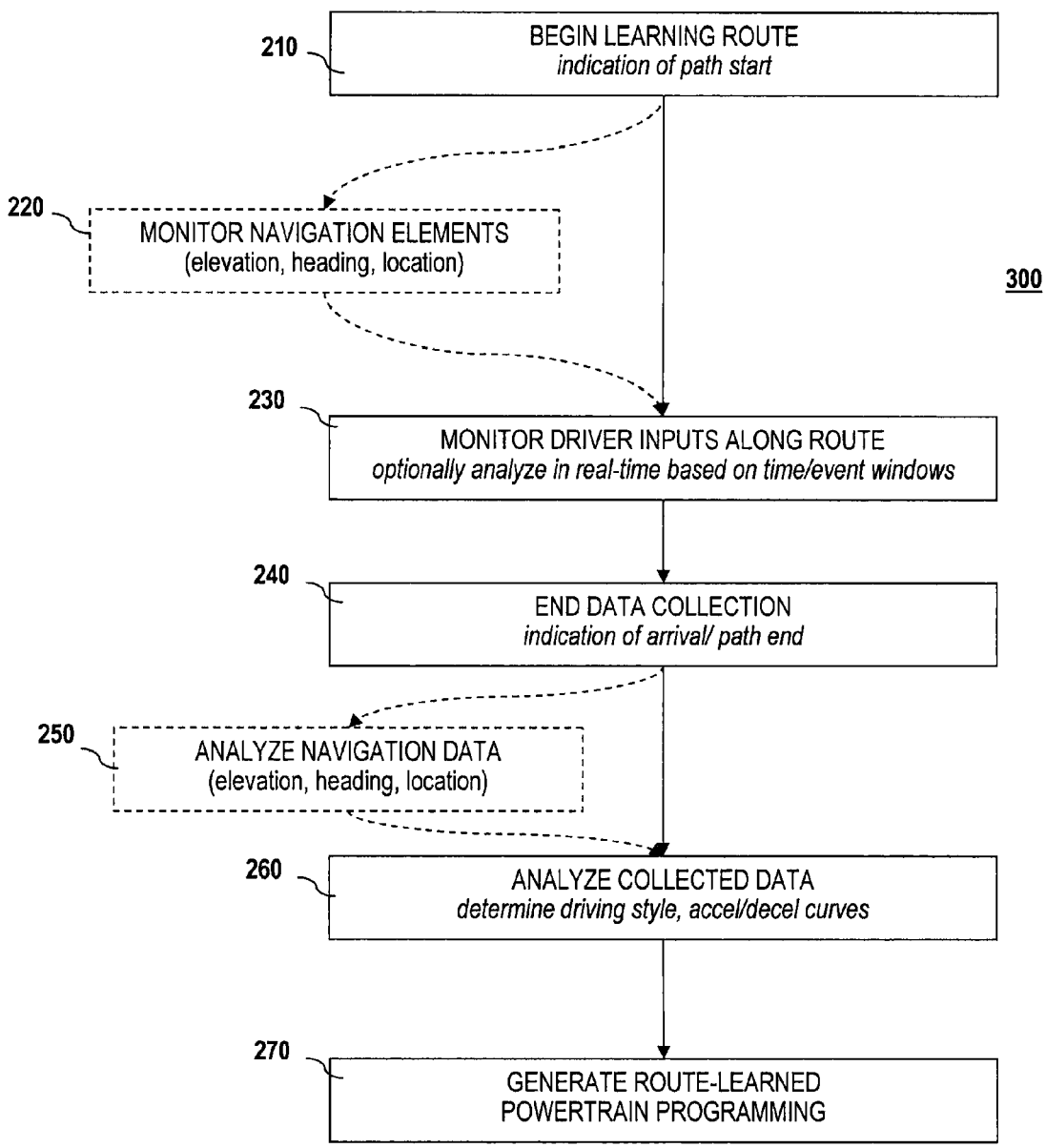
FIG. 3 shows an example process, performed by the FIG. 1 system, by which a new route is learned according to an embodiment described herein.

Referring now to FIG. 3, a method 300 performed by the route-learning powertrain control unit 110 to collect operating data and generate route-learned powertrain programming is described. At step 210, the route-learning powertrain control unit 110 receives an indication to begin learning a route. Generally, this is by a driver input to display 132, but it is understood as described above that it could be triggered by a navigation system 108, or another input. At step 230, the route-learning powertrain control unit 110 monitors driver input along the route and stores the collected data in memory 112. Step 230 can optionally be performed in real time, based on discrete time or event windows. At optional step 220, if any navigation elements 105 are connected to the route-learning powertrain control unit 110, data from those navigation elements 105 is also collected and stored in the memory 112. At step 240, the route-learning powertrain control unit 110 receives an indication that the vehicle has reached the end of the route. As above this could be by a driver input through the display 132 or from the navigation system 108, but it could also be by the driver turning off the vehicle.

After data collection has been completed, at step 260 the data is analyzed to determine a driving preference and/or preferred acceleration and deceleration curves. As noted above the driving preference determined could be aligned with one or more modes of operation (e.g., economy, sport, long-distance) or aligned along a scale that measures efficiency against desired performance. At optional step 250, data from any navigation elements 105 can also be considered to further refine performance. For instance, route-learning powertrain control unit 110 may use data from an altimeter to determine how the driver prefers acceleration and deceleration on hills, or data from an accelerometer to determine how the driver prefers to either brake or accelerate into curves. From the analyzed data in steps 250 and 260, the route-learned powertrain programming is generated and stored in memory 112, at step 270, for subsequent retrieval when the route is driven again (described below).

Figure 4:
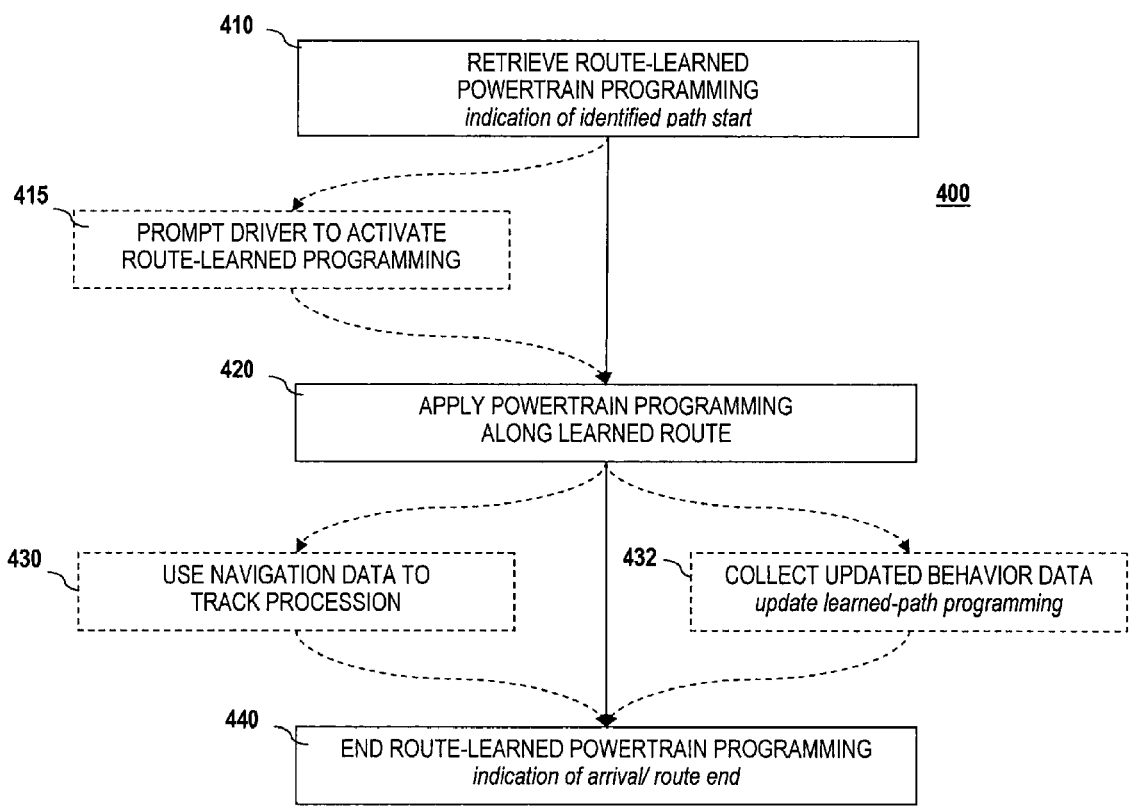
FIG. 4 shows an example process, performed by the FIG. 1 system, in which programming from a learned route is applied to optimize powertrain operation according to an embodiment described herein.

Referring now to FIG. 4, a method 400 performed by the route-learning powertrain control unit 110 to run route-learned powertrain programming is now described. At step 410, the route-learned powertrain programming is retrieved from memory 112 in response to a route start indication (as described above, this indication can be from a driver prompt or from the navigation system 108). Optionally, at step 415, the driver can be prompted to activate the route-learned programming. At step 420, the route-learned powertrain programming is applied throughout the duration of the route. At optional step 430, data from navigation elements 105 is used to track the vehicle's progress along the route. This can allow for a more precise application of powertrain control based on vehicle location, as opposed to applying the programming according to currently measured distance along the route. At another optional step 432, route-learning powertrain control unit 110 further monitors driver input along the route while applying the route-learned powertrain programming and stores any collected data in memory 112. This data can be used to update the route-learned powertrain programming so that the programming can be based on a larger sample set of actual driving. At step 440, the route-learning powertrain control unit 110 ceases modification of the powertrain programming when an indication of arrival or route end is received (as described above, from driver prompt, navigation system 108, or the driver turning off the vehicle).

It should also be appreciated that any or all of the features and functions of the route-learning powertrain control unit 110 and its associated memory 112 can be implemented as software stored on a storage medium within the vehicle and run on the vehicle's computer system or in specialized hardware.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the technology and are intended to be covered by the following claims.

What is claimed is:

1. A vehicle powertrain having a route-learning control feature comprising:
   at least one driver input for operating the vehicle; and
   a route-learning powertrain control unit connected to the at least one driver input and operable to, for a defined route, conform powertrain operation to prior-recorded driver-specific analytical data indicating at least one driver preference associated with the defined route and used to operate the vehicle in accordance with characteristics the driver prefers.

2. The vehicle powertrain of claim 1, wherein the route-learning powertrain control unit is operable to apply a plurality of driver preferences to a plurality of segments of an active route.

3. The vehicle powertrain of claim 1, further comprising a display with an interface for a driver to activate the route-learning powertrain control unit, the interface further allowing a driver to define a new route.

4. The vehicle powertrain of claim 1, wherein the at least one driver input comprises data from at least one of a steering column, accelerator pedal sensor, brake pedal sensor, or longitudinal or lateral acceleration sensors installed in the vehicle.

5. The vehicle powertrain of claim 1, further comprising a navigation system connected to the route-learning powertrain control unit to enable powertrain control whenever a route for which powertrain programming has been generated is selected.

6. The vehicle powertrain of claim 5, wherein the route-learning powertrain control unit is adapted to automatically generate powertrain programming for routes selected in the navigation system for which no powertrain programming has been previously generated.

7. The vehicle powertrain of claim 5, wherein data from at least one navigation element is further used in determining the at least one driver preference.

8. The vehicle powertrain of claim 1, further including at least one navigation element to enable monitoring of vehicle position on an active route.

9. The vehicle powertrain of claim 8, wherein the navigation element is one of a compass, an altimeter or an accelerometer.

10. The vehicle powertrain of claim 8, wherein if data from the navigation element indicates that the vehicle is not on an active route, the route-learning powertrain control unit is operable to prompt a driver of the vehicle to confirm that the active route is correct.

11. The vehicle powertrain of claim 1, wherein the at least one driver preference corresponds to one or more modes of operation of the vehicle.

12. The vehicle powertrain of claim 1, wherein the vehicle powertrain is a hybrid powertrain.

13. The vehicle powertrain of claim 12, further including at least one of a start/stop system for activating and deactivating an internal combustion motor, a regenerative braking system, a battery conditioning system, a variable cylinder displacement systems, and an Interactive Decel Fuel Shut-Off (iDFSO) system.

14. The vehicle powertrain of claim 13, wherein the at least one driver preference controls the operating parameters of the start/stop, regenerative braking, battery conditioning, variable displacement, or iDFSO systems.

15. The vehicle powertrain of claim 1, wherein the route-learning powertrain control unit comprises a memory for storing a plurality of defined routes and driving preferences for each of the defined routes.

16. A method of controlling a powertrain of a vehicle according to a learned route the method comprising:
retrieving powertrain programming from a vehicle memory when an indication of a start of a defined route is received; and
applying the powertrain programming to conform powertrain operation to prior-recorded driver-specific analytical data indicating at least one driver preference associated with the defined route and used to operate the vehicle in accordance with characteristics the driver prefers.

17. The method of claim 16, further comprising:
determining at least one driver preference for powertrain operation on a defined route according to data from at least one driver input;
generating powertrain programming for the defined route to conform powertrain operation along the defined route to the at least one driver preference; and
storing the powertrain programming in the vehicle memory.

18. The method of claim 16, further comprising a step of collecting data from at least one driver input while the vehicle is in operation on the defined route and comparing it against previously collected data to determine if the at least one driver preference for powertrain operation on the defined route should be changed.

19. The method of claim 16, further comprising:
using navigation data to determine if the vehicle is on the desired route; and
if the navigation data indicates that the vehicle is not on the desired route, prompting a driver of the vehicle to confirm that the active route is correct.

20. The method of claim 16, wherein the vehicle powertrain is a hybrid powertrain and the driver preference controls a regenerative braking system to enable single-pedal driving for at least one segment of the defined route.

* * * * *